United States Patent
Lavoie

(10) Patent No.: US 6,453,215 B1
(45) Date of Patent: Sep. 17, 2002

(54) IRRIGATION CONTROLLER

(76) Inventor: Nathan Lavoie, 192 Old Westford Rd., Chelmsford, MA (US) 01824

( * ) Notice: Subject to any disclaimer, the term of this patent is extended or adjusted under 35 U.S.C. 154(b) by 0 days.

(21) Appl. No.: 09/289,484

(22) Filed: Apr. 9, 1999

Related U.S. Application Data

(60) Provisional application No. 60/081,674, filed on Apr. 14, 1998.

(51) Int. Cl.[7] ............................. G05D 7/00; G05D 11/00
(52) U.S. Cl. ......................... 700/284; 700/11; 700/14; 700/16; 700/19; 700/20; 700/86; 137/78.2; 137/78.3; 137/624.11; 137/624.12; 137/624.18; 239/63; 239/64; 239/69; 239/70; 239/551
(58) Field of Search .............................. 700/16–18, 19, 700/20, 83–86, 284, 11–14; 239/63–64, 70, 69, 542, 67, 99; 137/1–2, 78.2–78.7, 624.12, 624.13–18, 624.11, 550–551

(56) References Cited

U.S. PATENT DOCUMENTS

| | | | | |
|---|---|---|---|---|
| 3,740,575 A | * | 6/1973 | Bizzoco .................... | 307/141.4 |
| 4,190,884 A | * | 2/1980 | Medina ........................ | 700/16 |
| 4,646,224 A | * | 2/1987 | Ransburg et al. ............. | 700/14 |
| 4,851,708 A | | 7/1989 | Palmer | |
| 4,922,433 A | * | 5/1990 | Mark .......................... | 700/284 |
| 4,937,732 A | | 6/1990 | Brundisini | |
| 4,951,204 A | | 8/1990 | Mylne, III | |
| 5,173,855 A | | 12/1992 | Nielsen et al. | |
| 5,229,937 A | * | 7/1993 | Evelyn-Veere .............. | 700/284 |
| 5,293,554 A | | 3/1994 | Nicholson | |
| 5,337,957 A | * | 8/1994 | Olson .......................... | 239/63 |
| 5,444,611 A | | 8/1995 | Woytowitz et al. | |
| 5,465,904 A | | 11/1995 | Vaello | |
| 5,473,309 A | | 12/1995 | Marcum | |
| 5,479,338 A | * | 12/1995 | Ericksen et al. ............... | 700/16 |
| 5,602,728 A | * | 2/1997 | Madden et al. ................ | 700/16 |
| 5,839,660 A | | 11/1998 | Morgenstern et al. | |
| 5,853,122 A | * | 12/1998 | Caprio ....................... | 236/44 C |
| 5,870,302 A | * | 2/1999 | Oliver .......................... | 700/11 |
| 5,908,045 A | * | 6/1999 | Wallace et al. ............ | 137/78.3 |
| 6,102,061 A | * | 8/2000 | Addink .......................... | 137/1 |

* cited by examiner

Primary Examiner—Ramesh Patel
(74) Attorney, Agent, or Firm—O'Connell Law Firm

(57) ABSTRACT

An irrigation controller in one embodiment comprising a microprocessor for controlling a plurality of watering zones of an irrigation system, a keyboard for enabling an inputting of commands relating to watering programs, a display for displaying information relating to watering programs, and an EEPROM for retaining information relating to watering programs and an on/off status variable even during extended periods without power. The irrigation controller may employ the EEPROM to retain a germinate watering program wherein everyday watering is triggered automatically and a multiplicity of watering start times can be selected. The irrigation controller may employ an analog precision rectifier for detecting how many valves are operational in a given watering zone, and the irrigation controller may also automatically adjust a maximum allowable current in response to how many valves are operational in a given watering zone. The irrigation controller may incorporate a power supply, and it may measure current draw from the power supply with an analog-to-digital converter and compare it to a maximum current capability of the power supply. A winterize mode may be provided, which allows simultaneous activation of multiple watering zones. A main controller may include a communication port comprising a four-wire interface that enables a transmittal of diagnostic information to a remote control device and enables remote operation of the valves of the irrigation system. Valve status may be indicated with a bi-color status LED.

21 Claims, 14 Drawing Sheets

Main Loop Flow  Fig. 6

Fig. 13 Germinate Flow

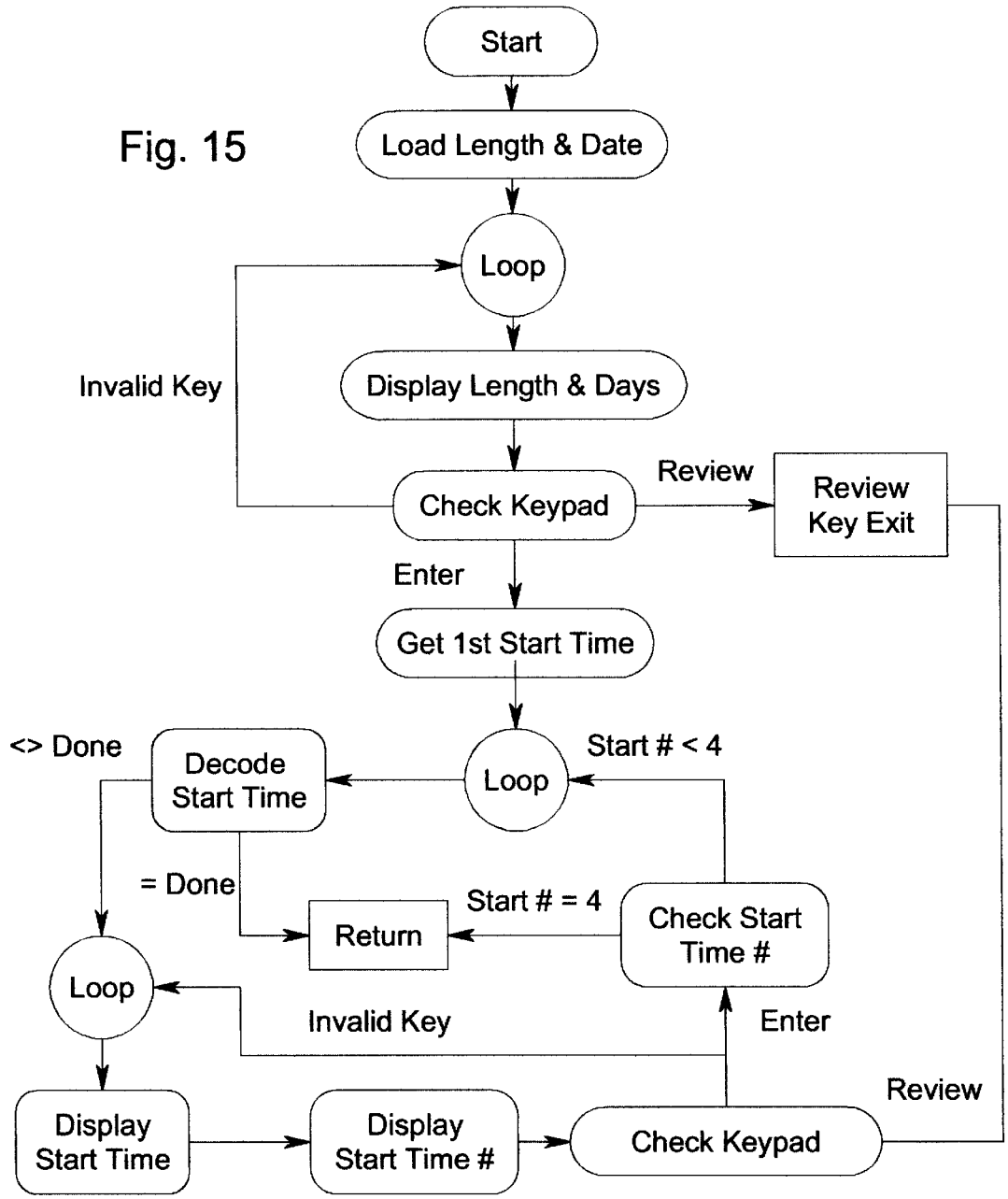
Fig. 15 Do Review Flow

IRRIGATION CONTROLLER

This application claims the benefit of U.S. Provisional Application No. 60/081,674 filing date Apr. 14, 1998.

FIELD OF THE INVENTION

The present invention relates generally to irrigation equipment. More particularly, the invention disclosed herein relates to a programmable irrigation controller for multiple watering zones.

BACKGROUND OF THE INVENTION

Vegetation typically grows in soil that has been watered by rain. However, normal and healthy growth of vegetation can be retarded and even prevented when natural rainfall fails to meet the requirements of that vegetation. Advantageously, artificial irrigation can compensate for the deficiencies of nature by supplying sufficient amounts of water directly to vegetation at predetermined intervals for predetermined lengths of time.

Early techniques for supplementing natural rainfall relative to vegetation located remote distances from a water source often comprised such rudimentary methods as a manual pouring of water directly onto vegetation by hand and bucket. Eventually, aqueduct systems simplified the task. A basic aqueduct systems typically comprises long furrows or pipes designed to transport water from a remote source, usually employing gravity, to an area immediately adjacent the vegetation sought to be watered. Eventually, diligent invention led to additional advances in irrigation. Animal power and mechanical lifting provided irrigation systems that were more efficient and less taxing on those who employed them.

Advances in generalized technology eventually led to still further improvements in irrigation. Steam power, the internal combustion engine, and electricity allowed irrigation systems to become fully mechanized. Previously state-of-the-art irrigation controllers gave way to mechanical devices with internal, often programmable, timers. These systems provided a means for automating the control of water flow from a pressurized water source through piping assemblies and the like to plural watering stations or zones.

Automatic electromechanical controllers for such systems typically incorporated conventional motor-driven electric clocks for allowing a user to program individual start times for particular irrigation cycles and watering stations. Calendar programs could provide the ability to select particular days for watering over a span of 14 days and more. With these electromechanical controllers, calendar programs would be operable by means of a disc that is rotated each 24 hours to a next-day position by a motor-driven clock. Unfortunately, such systems quickly become undesirably complex with increased numbers of watering zones, such as is required with golf courses, cemeteries, parks, and the like.

Again, innovation provided an incremental improvement with the development of solid state irrigation controllers thereby replacing the electric motors, mechanical switches, actuating pins, cams, levers, gears, and other mechanical devices with solid state electronic circuitry. With this, the systems allow programming of multiple start times and day programs for individual watering stations or zones, repeat cycles, and watering time selections in minutes or even seconds—all with increased accuracy coupled with a concomitant elimination of the complex interrelation of mechanical parts.

Generally, prior art solid state irrigation controllers incorporate a programmable microprocessor with a user interface that enables a programming of several watering stations or zones based on a plurality of timing variables such as daily, weekly, odd days, even days, start times, watering lengths, and still further variables. Each watering zone typically includes one or more sprinklers and a solenoid valve that is normally regulated by the microprocessor. The solenoid valves control the flow of water from a pressurized water source to a given watering zone. Certain systems visually communicate the current status of the system's programmable variables by use of such means as liquid crystal displays (hereinafter "LCD"). Some systems allow a user to override the preprogrammed automatic watering operations by manual intervention. This allows the system to account for unusual circumstances such as excessive rain or drought.

It will be immediately apparent that this lengthy evolution of irrigation systems has resulted in state-of-the-art systems that are exponentially more efficient, convenient, and effective than their predecessors. Unfortunately, however, as with nearly all things, even advanced systems remain imperfect.

For example, although known prior art irrigation controllers have enabled remote communication between a remote unit and a controller microprocessor, this communication has been decidedly one sided. Irrigation controllers have allowed for the remote operation of water valves and the like by a sending of information from the remote unit to the microprocessor. However, they have not allowed an opposite stream of communication—communication from the microprocessor to the remote unit. Accordingly, a remote user can not determine whether one or more watering zones is faulty (e.g., is in an open-circuit or closed circuit condition). Consequently, remote troubleshooting often becomes unduly burdensome.

Another shortcoming exhibited by prior art irrigation controllers is that they give a user insufficient flexibility. Although a user can select from multiple watering programs in prior art control systems, such systems do not allow a ready switching from one mode that employs one entire set of programs that the user has entered to a second or third mode that employs other sets of programs that the user has entered. Consequently, causing the irrigation controller to accommodate changes in seasons or the demands of germinating seeds are laborious tasks each and every time they must be accomplished.

Another shortcoming from which prior art irrigation controllers suffer relates to their current sensing circuitry, which is typically capable of sensing faulty valves within the irrigation system. Although such current sensing circuitry is useful for protecting an irrigation controller from harm from a faulty (i.e., shorted) valve, it is not capable of specifying how many valves are open in any given watering zone, which would allow the irrigation controller to adjust the maximum allowable current in the system. Furthermore, such systems are not able to determine when no valve is operational whereby the system may pump water with no valve open thereby causing damage to the pump and, possibly, other portions of the irrigation system.

A further deficiency in prior art irrigation controllers is that crucial information often is lost during extended periods when the overall system is without power, such as during winter months or extended periods of power failure. As a result, systems that lose their memory often will not recall whether they were on or off when they were last in use. When such a system again receives power, it may malfunction such as by activating water valves even while the system is down. Furthermore, such a system could lose all of the watering programs that had previously been entered such that a user would have to reenter each program sought to be employed.

Yet another drawback exhibited by irrigation controllers of the prior art is a common inability to provide a specialized mode that allows a user to activate multiple watering zones simultaneously. In day-to-day operation, this is a desirable restriction because having too many valves open during regular operation can cause malfunctions in the system such as from excessive loss in head. However, such an ability is highly desirable during such operations as winterizing procedures where a user seeks to blow the water from each of the zones to prevent damage from freezing water. As a result, with present-day irrigation controllers the user must activate each zone separately in an arduous and time-consuming procedure.

Finally, a most prevalent shortcoming exhibited by prior art irrigation controllers is that programming them is often a difficult and confusing task. For example, a user seeking to program a multiplicity of watering zones often is unable to determine which watering zone is presently selected for programming. Furthermore, other than by his or her own memory, users typically have no means of knowing which function of the irrigation controller he or she is programming. As a result, users typically are forced to program an irrigation controller blind whereby the programming procedure often proves arduous and frustrating.

Accordingly, it is clear that it would be advantageous if the evolution of irrigation controllers were to continue with an invention that could provide a solution to one or more of the deficiencies left by the prior art. However, it is still clearer than an irrigation controller presenting a solution to each and every one of the aforementioned deficiencies in the prior art while providing a number of heretofore-unrealized advantages would comprise a marked advance in the art.

SUMMARY OF THE INVENTION

Advantageously, the present invention sets about with the broadly-stated goal of providing an irrigation controller that meets each of the aforementioned needs that have been left unmet by the prior art and thereby presents a further step in the evolution of irrigation in general.

Stated more particularly, a principal object of the present invention is to provide an irrigation controller that is capable of sending diagnostic information and the like from a main irrigation control unit to a remote unit that can be retained by a user in the field to provide for efficient system diagnosis and repair.

A further object of the invention is to provide an irrigation controller that allows flexible shifting between a plurality of watering modes including specialized modes for germinating seeds and the like.

The invention has the still further object of providing an irrigation controller that does not lose memory even during extended periods without power. A resultant object is to provide an irrigation system that remembers whether it was on or off when it was last powered and that remembers irrigation programs that have been stored in its memory.

An additional object of the invention is to provide an irrigation controller that provides a specialized mode, which may be termed a winterize mode, wherein a user can manually activate a multiplicity of watering zones simultaneously whereby winterizing procedures can be carried out more efficiently and conveniently.

The invention also seeks to provide an irrigation controller that incorporates current sensing circuitry that can detect how many valves are operational in each watering zone to allow the irrigation controller to adjust the maximum allowable current in the system and can prevent damage to the irrigation system by detecting when no valve is operational.

A still further object of the invention is to provide an irrigation controller that guides a user through the programming process by providing an indication of presently selected altering zones and, possibly, programming functions.

In accomplishing the aforementioned and still further objects and advantages, a most basic embodiment of the irrigation controller includes a means for enabling an inputting of commands relating to watering programs, a means for processing commands relating to watering programs, a means for controlling a plurality of watering zones according to the commands, a means for retaining information relating to watering programs, and a means for displaying information relating to watering programs. In this embodiment, the means for enabling an inputting of commands, the means for receiving and processing commands and controlling a plurality of watering zones, and the means for retaining information in combination may be termed a means for allowing a user to establish watering programs.

Preferably, the means for allowing a user to establish watering programs will enable a programming of a selected start time and a selected watering length individually for each of the watering zones while further allowing a programming of a single selected start time and a single selected watering length for a plurality of watering zones. The means for processing commands relating to watering programs and the means for controlling the plurality of watering zones according to the commands may comprise a microprocessor.

The irrigation controller may be improved further by enabling a programming of a Skip Day command wherein the watering program skips one or more days, a Water Percent command wherein the watering program waters for a selected percentage of the selected watering length, and, additionally or alternatively, a Germinate command wherein a germinate watering program temporarily replaces a basic watering program.

Ideally, the irrigation controller will include a means for preventing simultaneous operation of a number of valves excessive of the maximum number of valves that allows for proper operation of the irrigation system during a normal operation of the irrigation controller. This means may comprise a power supply with a maximum current capability, a means for measuring current draw from the power supply, which may comprise an analog-to-digital converter, and a means for comparing the current draw from the power supply with the maximum current capability of the power supply.

Furthermore, a preferred means for allowing a user to establish watering programs will further enable an inputting of a Winterize command wherein a multiplicity of valves can be operated simultaneously. Further advantage may be had by providing a Review command that causes the irrigation controller to enter a review mode wherein the means for enabling an inputting of commands relating to watering programs is disabled whereby a user can review a given watering program without risk of accidentally altering the watering program.

Preferred embodiments of the irrigation controller will further include a means for retaining information relating to watering programs in the absence of power. With this, the irrigation controller can retain watering programs and an indication as to whether the irrigation controller was last on or off even during extended periods without power. This means may comprise an electrically erasable programmable read-only memory device (EEPROM) operably associated with the microprocessor. Ideally, the EEPROM will include sufficient read-only memory for simultaneously retaining a plurality of watering programs that can be selectively accessed.

A further refinement of the invention may be in the form of a means for detecting how many valves are operational in a given watering zone, which may comprise an analog precision rectifier, and a means for automatically adjusting a maximum allowable current in response thereto.

Yet another improvement to the irrigation controller may comprise a remote control unit in cooperation with a means for transmitting diagnostic information to the remote control unit regarding a status of the valves of the irrigation system. Preferably, such an irrigation controller would be further supplemented by a means for inducing remote operation of the valves of the irrigation system. The means for transmitting diagnostic information to the remote control unit ideally will comprise a means for sending a signal from the remote control unit to the microprocessor to induce the microprocessor to send a test signal to each valve in the irrigation system, a means for measuring a current across each valve, a means for determining based on the current across the valve whether each valve is open or shorted, a means for transmitting whether each valve is open or shorted to the remote control unit, and a means for displaying the status of the valves in the irrigation system on the remote control unit. The means for displaying the status of the valves on the remote control unit may comprise at least one LED numeric display in combination with a bi-color status LED. With this, the LED numeric display can display the number or numbers of any faulty zones, and the bi-color status LED can indicate with a first color whether the faulty zone is open and with a second color whether the faulty zone is shorted. The means for transmitting diagnostic information to the remote control unit may be founded on a communication port comprising a four wire interface with two wires sending power and ground and two wires providing a differential signal path.

To simplify programming of the irrigation controller and to eliminate blind programming, the preferred irrigation controller includes a means for selecting one or more of the plurality of watering zones to create a selected watering zone or zones in combination with a means for indicating the selected watering zone or zones. The means for selecting one or more of the plurality of watering zones may comprise a plurality of keys, such as membrane keypad keys. The means for indicating the selected watering zone or zones may comprise an indicator mechanism, such as an indicator light that may be an LED, disposed proximate to each key for indicating whether the watering zone that is selectable by that key is a selected watering zone. The means for indicating selected watering zones may be supplemented by a means for indicating an active programming function, such as the Start Time and Watering Length functions.

Of course, one should remain mindful that the foregoing discussion is designed merely to outline broadly the more important features of the invention to enable a better understanding of the detailed description that follows and to instill a better appreciation of the inventor's contribution to the art. Before an embodiment of the invention is explained in detail, it must be made clear that the following details of construction, descriptions of geometry, and illustrations of inventive concepts are mere examples of possible manifestations of the invention.

BRIEF DESCRIPTION OF THE DRAWINGS

In the accompanying drawings:

FIG. 15 is a flow chart of the embedded Do Review subroutine according to the present invention.

DETAILED DESCRIPTION OF A PREFERRED EMBODIMENTS

Figure 1:
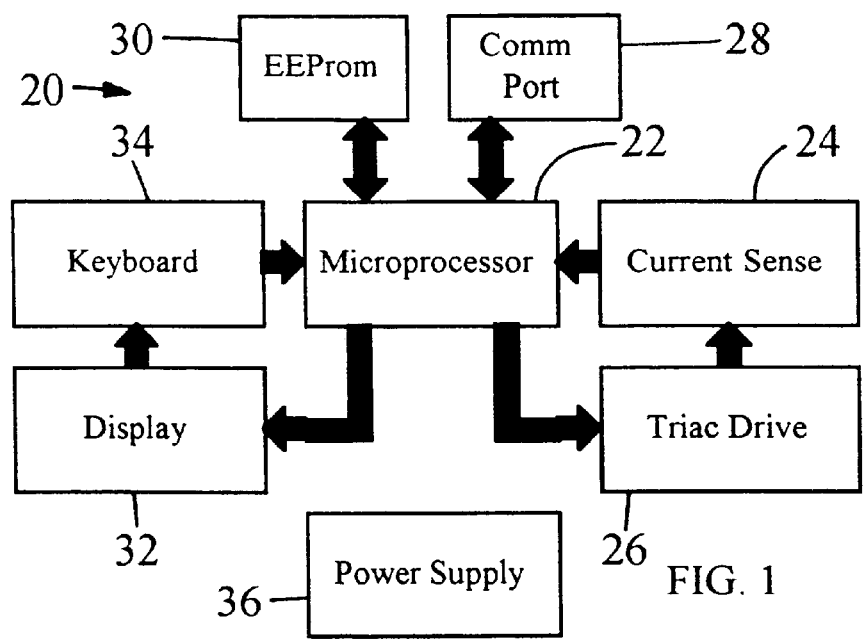
FIG. 1 is a diagram of an embodiment of the present invention for an irrigation controller.

Looking more particularly to the figures, one sees a most basic embodiment of the invention depicted schematically in FIG. 1. The irrigation controller 20 is founded on a microprocessor 22, which controls all timing and switching functions. Included in the microprocessor 22 is a microcontroller integrated circuit with associated I/O lines for transfer of control signals for other elements of the irrigation controller 20. As will be made most clear below, the microprocessor 22 may well be termed a means for receiving and processing commands relating to watering programs and also a means for controlling the plurality of watering zones according to those commands. It is conceivable, though not preferred, that the microprocessor 22 could be supplanted by mechanical switches and timing motors (not shown).

Current sense circuitry 24 is interposed between a triac drive 26 and the microprocessor 22, and a power supply 36 is provided for powering the microprocessor 22 in particular and the irrigation controller 20 in general. A communication port 28 is bi-directionally coupled to the microprocessor 22 as is an electrically erasable programmable read-only memory device (EEPROM) 30, which may be termed a means for retaining information relating to watering programs. Although the EEPROM 30 is preferred, it is possible that another means could be employed, such as RAM, which may be battery backed, a magnetic disc, an optical disk, flash RAM, or any other appropriate means, none of which are shown.

A further element of the irrigation controller 20 comprises a display 32, which may be an LED display 32, that receives display signals from the microprocessor 22. The LED display 32 is operably coupled to a means for enabling a selecting of one or more watering zones and a means for enabling an inputting of commands relating to watering programs for the watering zones. Preferably these means comprise a membrane keypad keyboard 34 and function keys including those indicated at 38, 44, 46, 48, 50, 52, 54, 60, 62, 64, and 68, which are in turn operably coupled to the microprocessor 22. Certainly the means for enabling a selecting of one or more watering zones and the means for enabling an inputting of commands could assume a wide variety of forms other than the keyboard 34 and the respective function keys including those indicated at 38, 44, 46, 48, 50, 52, 54, 60, 62, 64, and 68. For example, one or both of the means for enabling a selecting of one or more watering zones and the means for enabling an inputting of commands alternatively could comprise mechanical dial switches or buttons, a touch-sensitive screen, a voice recognition arrangement, resistive potentiometers, or any other effective means, none of which are shown.

Turning more particularly to the basic components of the irrigation controller 20, the preferred power supply 36 is a 24 VAC transformer that supplies power to valves in an irrigation system that is controlled by the irrigation controller 20 and to regulated supplies for DC power to the solid state circuitry. The DC section of the power supply 36 should supply 250 mA of current into +6 VDC to run the microprocessor 22, the EEPROM 30, analog amplifiers, and the LED display 32. It will be noted that the LED display 32 is likely to use most of the DC current from the power supply 36. The analog amplifiers also use a negative supply. However, there are other implementations that do not require a negative supply. There are multiple methods of deriving a +6 VDC supply from the transformer output. Consequently, the exact configuration is left to the reader's discretion as it is non-critical provided that the current requirement is met. The power supply 36 also has a limited backup (not shown) to run a system clock (not shown) so the irrigation controller 20 can keep time during most power outages and brownouts.

The triac drive 26 comprises triacs for each watering zone for switching the 24 VAC power on for a given watering zone. The schematic can be found in almost any triac manufacturer's application notes and will be well known to one skilled in the art. A current sensing resistor (not shown) is used in the power line to allow the current sense circuitry 24 to measure the current that the triac 26 is supplying to the valves of the irrigation system.

A digital input (not shown) is used to connect a rain or moisture sensor. By using a digital input rather than breaking the common line to the valves, as is conventionally done, the irrigation controller 20 can tell the user when the sensor is active. The irrigation controller 20 can also override the sensor in certain modes, specifically manual and remote control mode so the user does not need to short the sensor to activate the clock during servicing. The rain sensor simply sends a digital high voltage out one terminal and senses that high voltage with a second terminal to detect if the sensor is closed.

Figure 2:
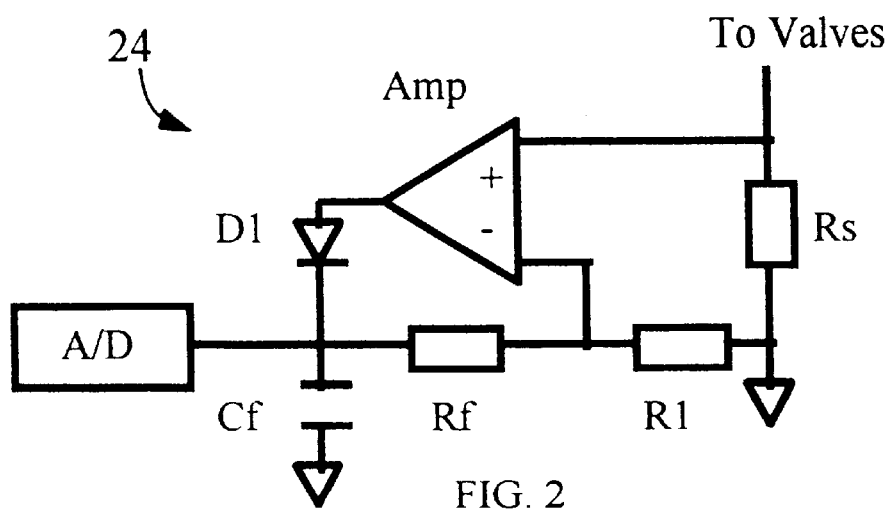
FIG. 2 is a schematic of an analog current sense circuit according to the present invention.

Looking more particularly to the current sense circuitry 24, which is depicted in FIG. 2, one will appreciate that the present invention improves over even those prior art irrigation controllers that have over-current sensors that protect the controllers from faulty valves. To do so, the present irrigation controller 20 employs an analog precision rectifier that acts not only as a means for detecting a shorted valve, but also as a means for detecting how many valves are operational in a given watering zone and a means for measuring the current across each valve. Cooperation of the current sense circuitry 24 with the microprocessor 22 enables the microprocessor 22 to adjust the maximum allowable current from the power supply 36 automatically. The maximum allowable current alternatively could be adjusted automatically in response to how many valves are operational in a given watering zone by an analog compare circuit, digital discrete logic, or any other appropriate means, none of which are shown.

The irrigation controller 20 can also detect when no valve is present, which will cause the irrigation controller 20 to shut down. This is particularly advantageous in pump systems because it prevents the pump from running with no valve open, which would likely result in damage to the pump. This circuitry 24 also allows the irrigation controller 20 to sense if anything is connected to a master valve terminal. As will be described more fully below with reference to FIG. 3, if the master valve terminal is open, a master valve status LED 72 does not light thereby indicating to the user that nothing is connected.

The ability of the current sense circuitry 24 to measure the current draw and to monitor this current draw against the output current capability of the transformer power supply 36 allows the irrigation controller 20 to let the user enter a mode that allows multiple zones to be activated simultaneously. This is useful when preparing an irrigation system for winter conditions. The preferred embodiment of this feature is a Winterize key (not shown) on the remote (not shown) to give easy, clear access to this feature while the system is serviced but to prevent this mode from being entered in normal operation of the irrigation controller 20. By letting the user open several valves simultaneously during Winterize mode, water can be blown out of the system several times faster thereby reducing service time.

The irrigation controller 20 further provides a means for preventing simultaneous activation of multiple watering zones when the irrigation controller 20 is not in a Winterize mode so that the irrigation controller 20 still protects itself during normal operation from too many valves being open to operate correctly. This means may be considered to include the power supply 36 and the current sense circuitry 24 in cooperation with the microprocessor 22, which acts as a means for comparing the current draw from the power supply 36 with the maximum current capability of the power supply 36. Alternative means for comparing the current draw from the power supply 36 with the maximum current capability of the power supply 36 could comprise such means as an analog compare circuit (not shown) or digital discrete logic (not shown).

Figure 3:
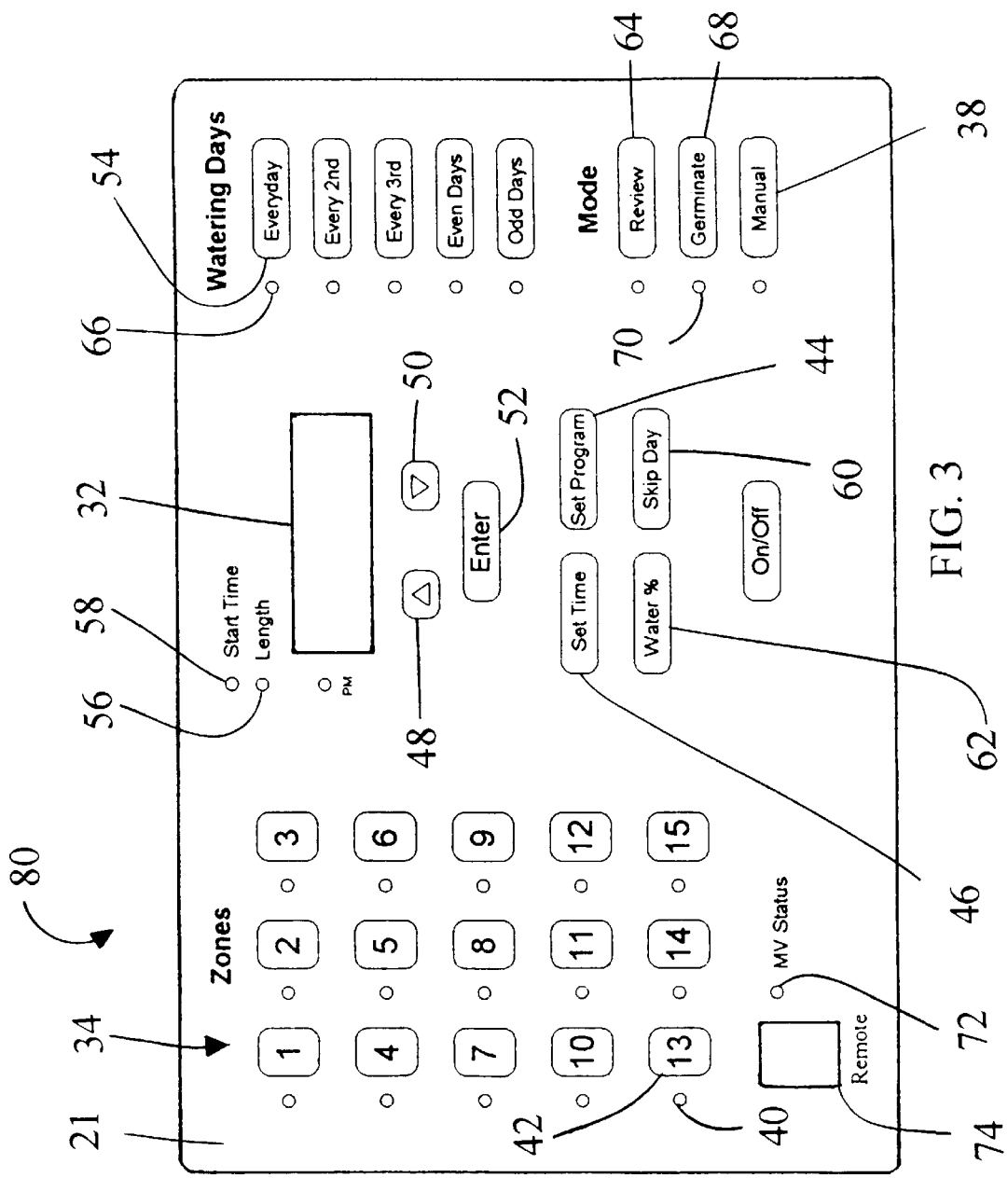
FIG. 3 is a view in front elevation of an embodiment of the main controller of an irrigation controller according to the present invention.

In the schematic for the analog current sense circuitry 24 of FIG. 3, the current is given by the formula $I_{triac}=V_{a/d}/R_s (R_1/R_f)$. $C_f$ filters the output to provide a peak measurement. The current sense circuitry 24 acts as an A/D converter to function as a means for measuring current draw from the power supply 36 and for supplying the microprocessor 22 with a digital reading of the current draw. By placing the diode in the feedback loop, forward drop is reduced by the open loop gain of the amplifier thereby nearly eliminating offset. Because the input is referenced to ground and the input signal is AC, the amplifier requires a positive and a negative supply. This current sense circuitry 24 is provided separately for the master valve circuit and zone circuits to allow the microprocessor 22 to measure the current of each circuit 24 independently.

One will note that the communication port 28 is provided with a bi-directional coupling to the microprocessor 22. With this bi-directional communication, a remote unit not only can induce remote operation of the valves of an irrigation system, but it also can give remote diagnostic information to the user. With this, the irrigation controller 20 provides a means for displaying the status of all valves of an irrigation system without a need for physical access to the display 32, the microprocessor 22, and the like. When a scan key is pressed on the remote control unit, the microprocessor 22 sends a test signal to each valve, measures its current, and updates the status variables that indicate whether that valve's solenoid is drawing too much current, which would indicate that it is shorted, or too little current, which would indicate that it is open. These status variables are then sent through the communication port 28 to the remote. The remote then displays to the user any zones that are faulty by means of an LED numeric display. The remote further indicates whether that zone is shorted with a red indication or open with a yellow indication by means of a bi-color status LED. With this, the communication port 28 may be considered to comprise a means for transmitting diagnostic information to a remote unit regarding a status of the valves of the irrigation system and a means for sending a signal from the remote unit to the microprocessor 22 to induce the microprocessor 22 to send a test signal to each valve in the irrigation system.

In the preferred embodiment, the communication port 28 essentially comprises a wired data link with a four-wire interface wherein two wires send power and ground to the remote control unit's receiver and two wires provide a differential signal path. The signal is half-duplex differential zero to five volt. Many serial communication standards can be used without affecting overall performance, but it should be noted that this preferred embodiment was chosen to minimize wire count while providing excellent noise immunity. The preferred wired data link communication port 28 could be supplanted by a radio data link, an infra-light link, or any other appropriate communication port 28, none of which are shown.

The EEPROM 30 is basically one integrated circuit designed to act as a means for retaining memory in the absence of power. Any EEPROM 30 integrated circuit can be utilized as long as it has sufficient memory to hold watering programs and a status variable indicating whether the irrigation controller 20 was on or off when last powered. In lieu of the EEPROM 30, the means for retaining memory in the absence of power alternatively, although not presently preferred, could comprise battery backed RAM, flash memory, a magnetic disk, an optical disk, or any other appropriate means, none of which are shown. Advantageously, the EEPROM 30 stores multiple sets of programs thereby giving the user added flexibility. Although prior art irrigation controllers are able to retain multiple programs, the present invention is unique in this respect because its exploitation of the EEPROM 30 allows it to retain multiple watering programs interchangeably. For example, one can program the irrigation controller 20 to water for spring conditions where fewer start times or shorter run times are typical. Then, the irrigation controller 20 can be switched between modes to permit entry of an additional watering program such as a summer program where more start times or longer run times are required. With this, both programs can be saved in EEPROM 30 and the irrigation controller 20 need not be reprogrammed as the seasons change. Only one watering program is active in the microprocessor 22 at any one time, and the others are dormant and only become active when the mode is switched to access them.

A still more unique use of the EEPROM 30 and a unique aspect of the present invention overall is the provision of a Germinate program that is designed to retain an increased number of start times but has everyday watering selected automatically by default. With this, the irrigation controller 20 can be programmed with one or more normal watering programs and then switched to a Germinate mode designed for meeting the needs of a newly seeded lawn. When the grass starts to grow, the Germinate mode can be simply deselected, and the irrigation controller 20 will readily return to a normal watering program.

Figure 11:
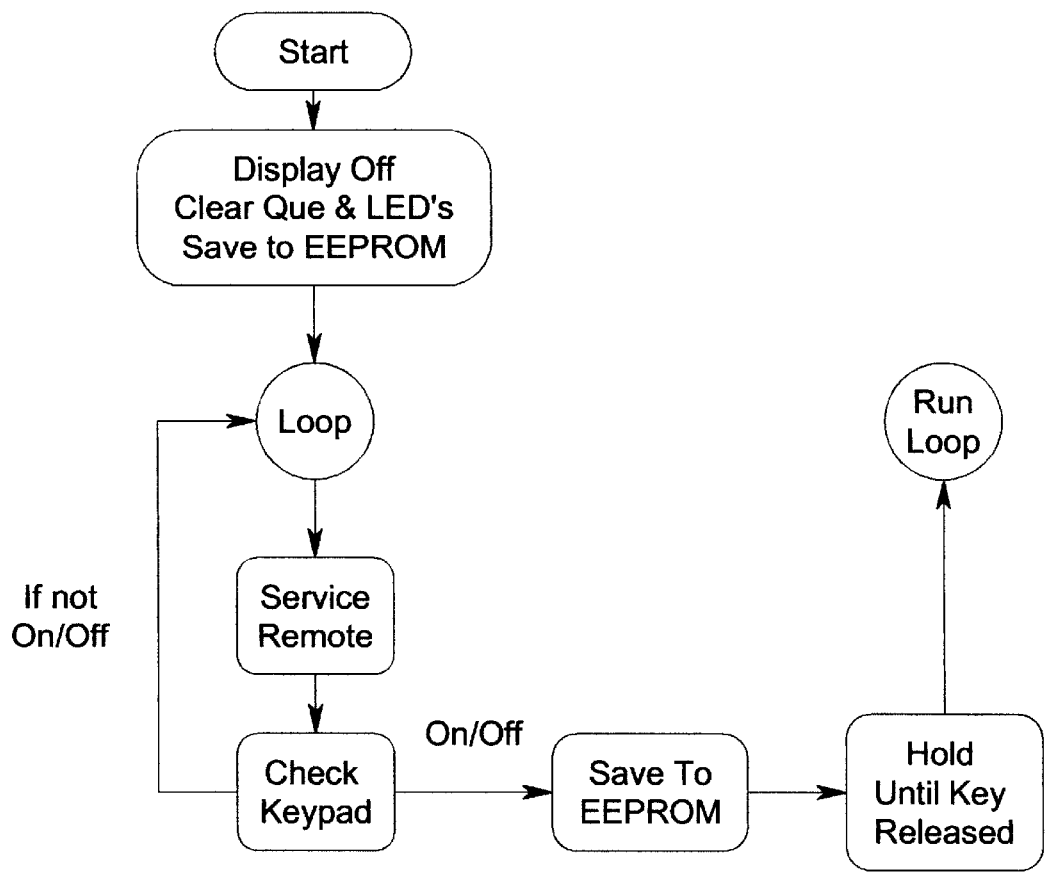
FIG. 11 is a flow chart of the Off subroutine according to the present invention.

Advantageously, the memory retention ability of the EEPROM 30 also allows it to store whether the irrigation controller 20 is in an on or off mode when it last was powered so that it will prevent activation of the valves while the irrigation controller 20 is intended to be shut down. Such a long-term memory is needed where the irrigation controller 20 is off during a winter season or where the power fails long enough to drain the irrigation controller's 20 back-up power. The irrigation controller 20 accomplishes this by saving an off status variable in the EEPROM 30 when an off key is pressed on the keyboard 34. This Off subroutine is shown in FIG. 11. As a result, the irrigation controller 20 permanently remembers that it was turned off. When the irrigation controller 20 is toggled back on, the status variable is updated and saved to the EEPROM 30. As a result, the EEPROM 30 always remembers the current status of the irrigation controller 20. When initializing from a power failure or an extended shutdown period, this status variable is read from the EEPROM 30 thereby allowing the irrigation controller 20 to remember whether it was off or on before the power failure or shutdown occurred. Of course, the EEPROM 30 also stores all watering programs. With this, the watering programs are retained even during extended periods without power where any backup power fails. As with the status variable, the normal watering program is automatically read from EEPROM 30 during initialization.

Looking again to FIG. 1, one sees yet another unique feature of the irrigation controller 20 in the form of the feedback from the display 32 to the keyboard 34 that allows a simplified programming procedure while providing superior flexibility. The arrow between the display 32 and the keyboard 34 in FIG. 1 indicates that the display 32 reacts to the keys 42 pressed and gives the user feedback. With this, each key 42 may be considered a means for selecting one or more of the watering zones to create a selected watering zone or zones. It is within the scope of the invention that the keys 42 could comprise any effective type including the preferred membrane keypad keys 42, keys on a touch sensitive screen, traditional computer keyboard-type keys, or any other effective keys.

Looking to FIG. 3, a depiction of the front panel 21 of the main controller 80 of the irrigation controller 20, one sees that an indicator mechanism 40 or indicator light 40, which preferably comprises LED 40, is disposed proximate to each key 42. Advantageously, when a watering zone represented by a given key 42 is selected, the LED adjacent to that key is activated to indicate the currently selected watering zone or zones. For example, if zones 2, 5, and 9 are selected, then each of the LED's 40 adjacent to the keys 42 for zones 2, 5, and 9 will light. Of course, providing an LED 40 adjacent to each key 42 comprises just one of a multitude of possible means for indicating a current selection, which means may be considered to be an element of a means for displaying information relating to watering programs. For example, a wide variety of other means could be employed to indicate a current selection or selections such as an LCD indicator, a touch-sensitive screen performing both keyboard and display functions, a CRT, or any other effective means, none of which are shown.

Figure 7:
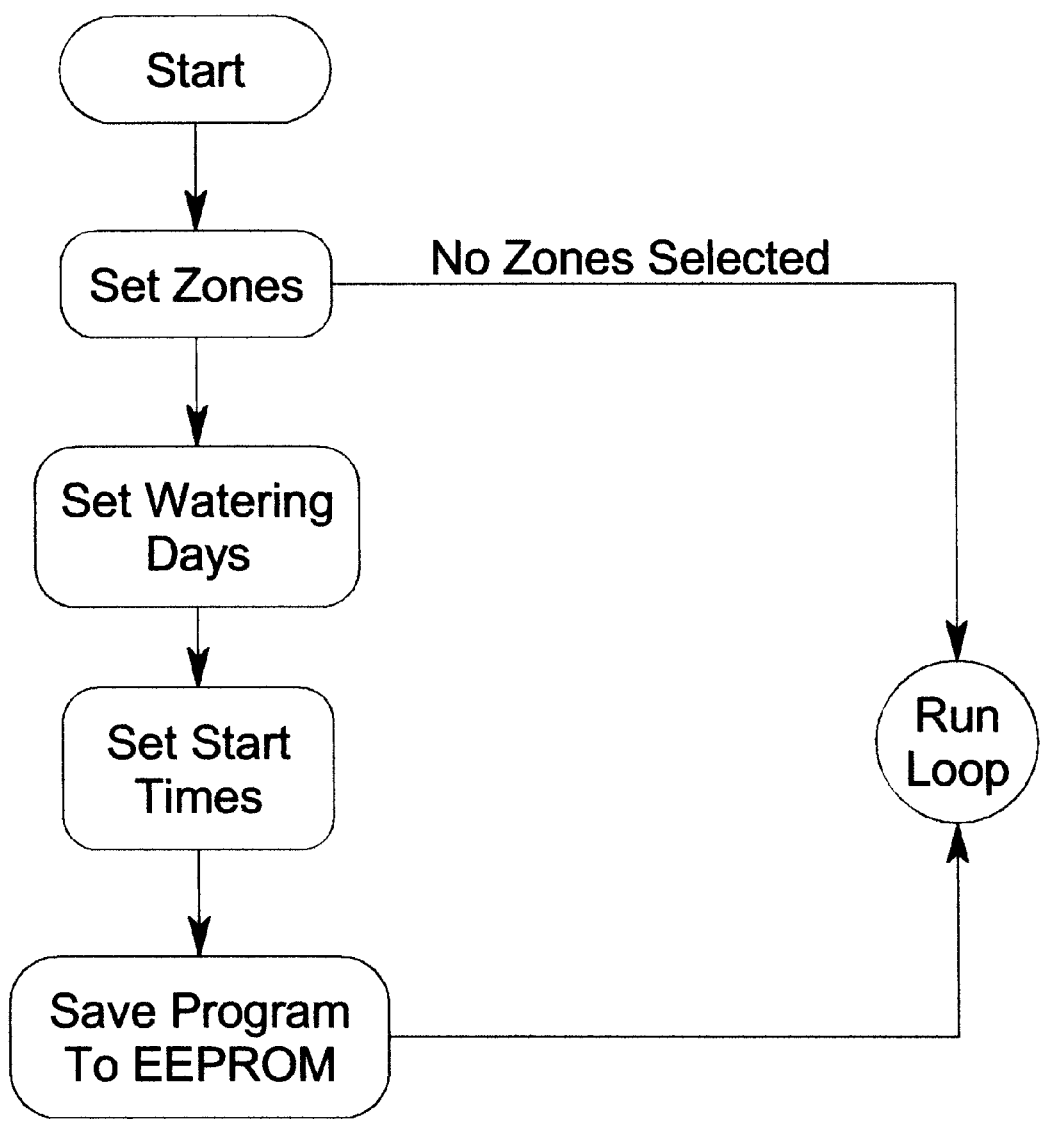
FIG. 7 is a flow chart of the Set Program subroutine according to the present invention.

Advantageously, the irrigation controller 20 utilizes independent zone programming wherein each zone has its own set of start times, watering lengths, and day cycle. This allows maximum flexibility without confusing the end user with assigning zones to different programs. In addition, multiple zones can be selected together to simplify programming when full flexibility is not needed. When multiple zones are selected, the LED's 40 for each of the zones will light and the start times and cycle days are copied to each selected zone, but the watering length is always set separately for each zone. After Set Program 44 is pressed and the zones are selected, the programming sequence, which is shown in FIG. 7, is preset to Set Cycle days for all zones, set each zone's length, and Set Start times for all zones. Getting lost in the middle of programming is minimized by not allowing the user to jump steps while programming.

By using LED's 40 adjacent to the keys 42 integrated with the display 32, the irrigation controller 20 is able to guide the user to the next step, making the programming self-prompting. Although an LED display 32, ideally in combination with the LED's 40, presently is the preferred means for displaying information relating to watering programs, it is well within the scope of the invention for information relating to watering programs to be displayed by an LCD display, again ideally in combination with an indicator mechanism such as LED's 40, by a touch-sensitive screen performing both keypad and display functions, by a CRT, or by any other effective means for displaying information relating to watering programs, none of which are shown.

Figure 4:
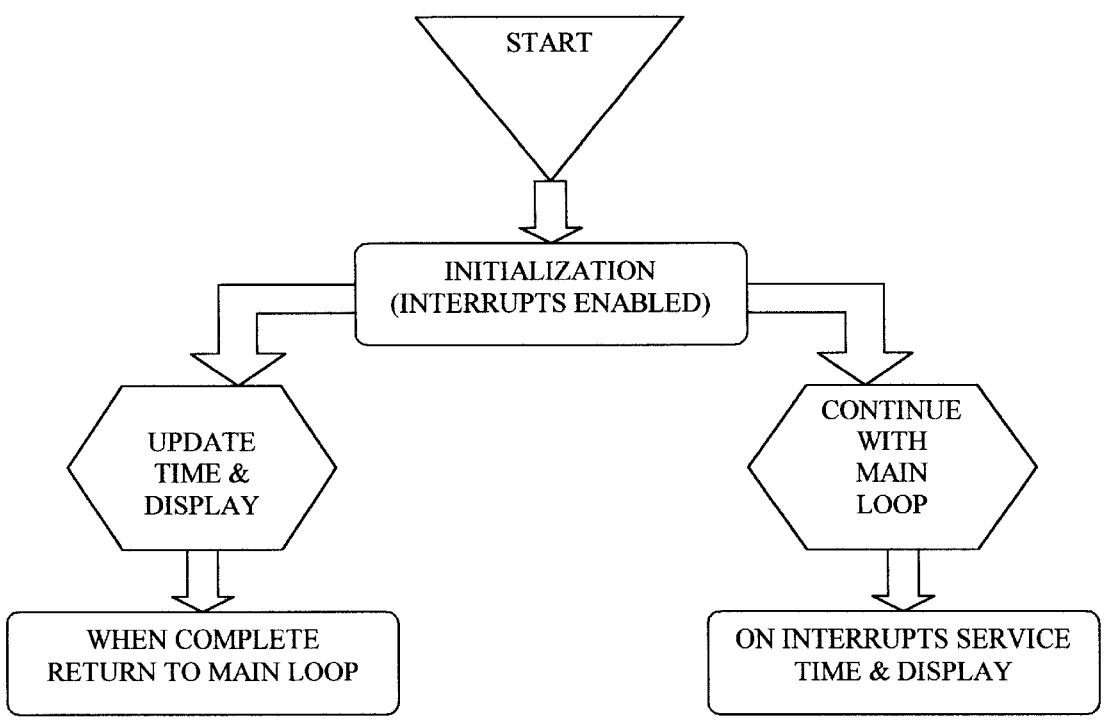
FIG. 4 is a flow chart of the Initialization subroutine according to the present invention.
Figure 5:
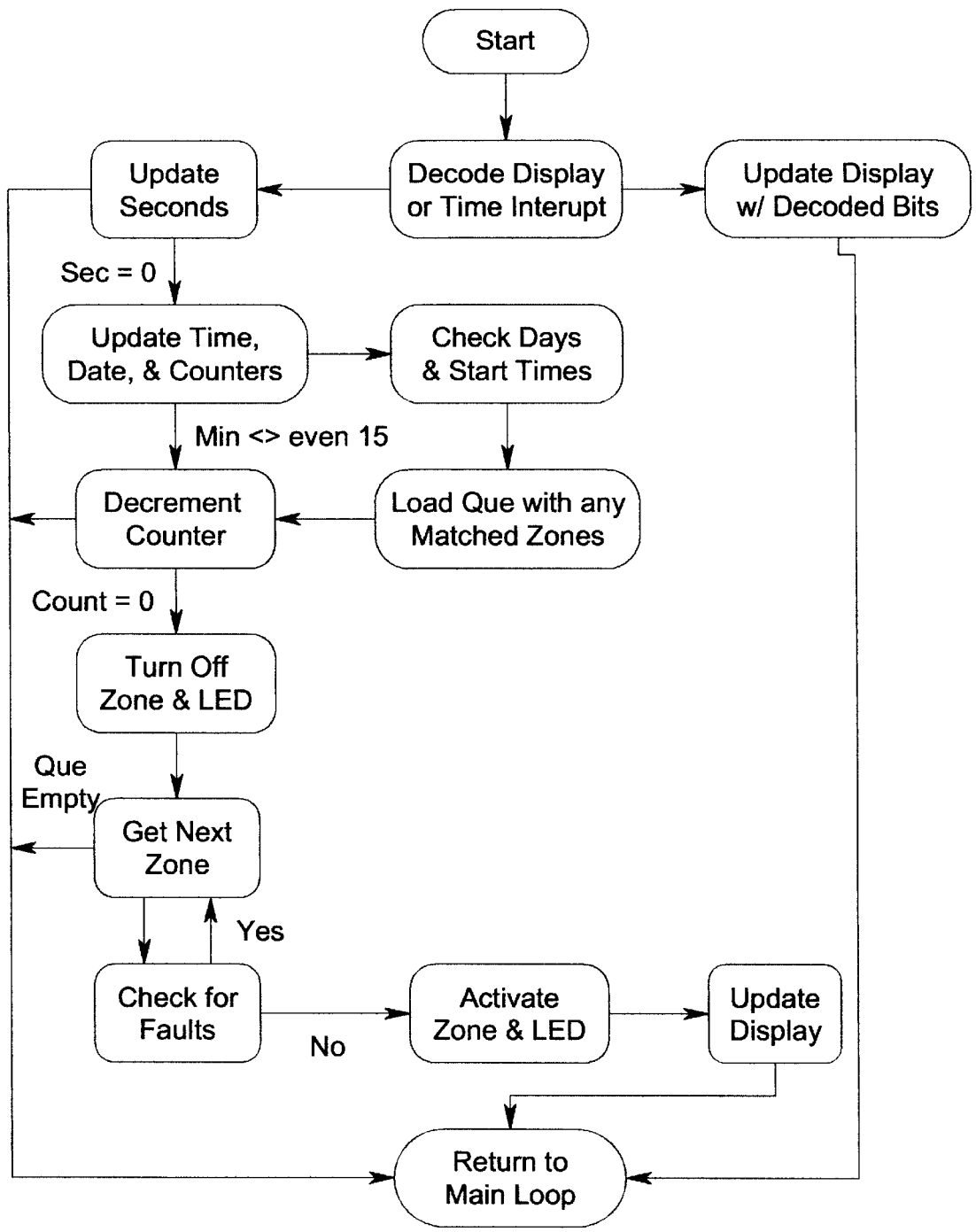
FIG. 5 is a flow chart of the Interrupt flow subroutine according to the present invention.
Figure 6:
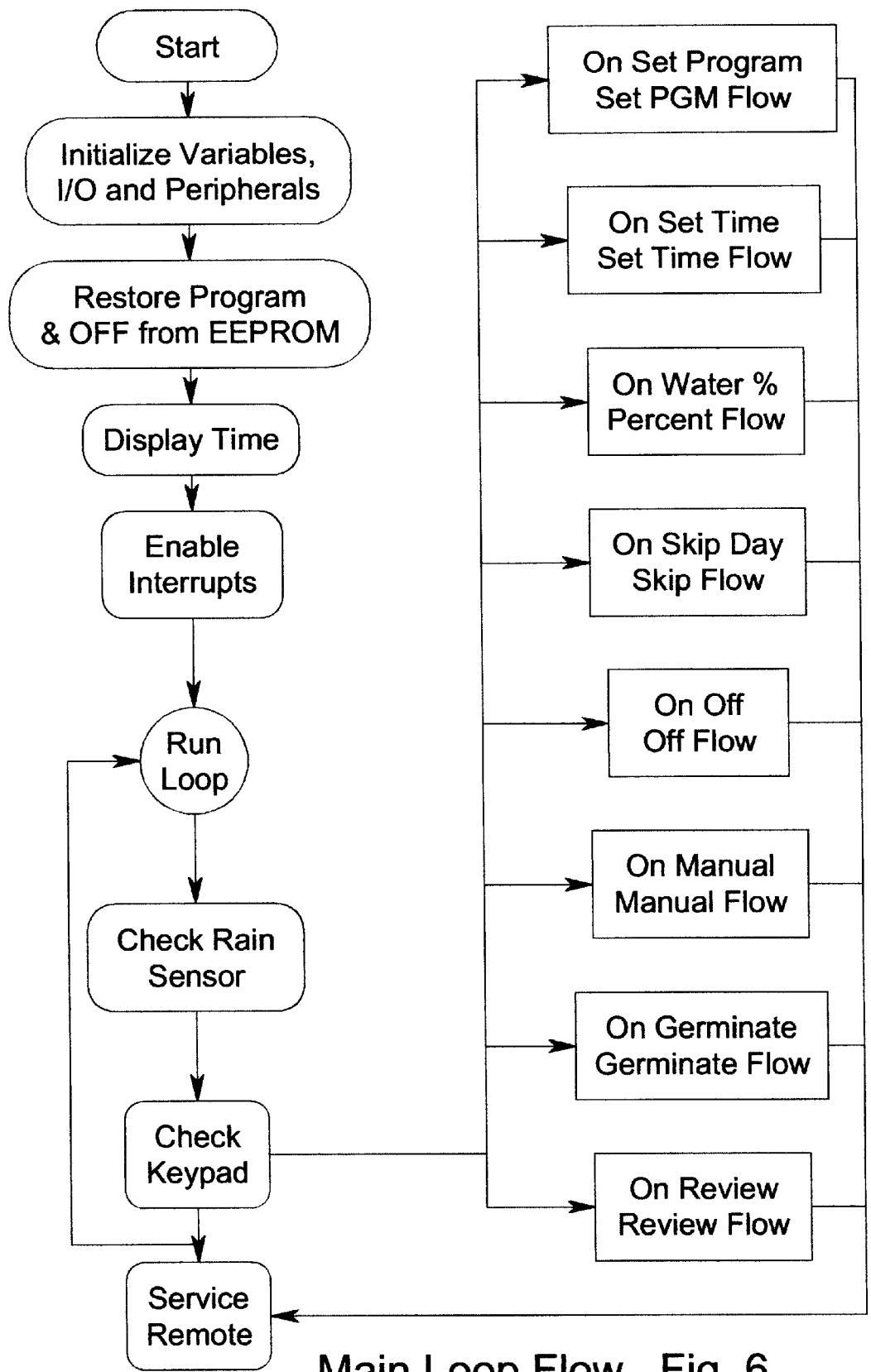
FIG. 6 is a flow chart of the Main Loop subroutine according to the present invention.

To gain a better understanding of the programming of the present invention, which will be described particularly below, one may additionally have reference to FIGS. 4–15, which depict flow charts for various routines and subroutines of the program that governs the operation of the irrigation controller 20. Most informatively, FIG. 6 shows the flow of the Main Loop of the irrigation controller 20. Also, FIG. 4 depicts the Initialization subroutine for the irrigation controller 20. One may also refer to FIG. 5, which sets forth the Interrupt subroutine.

Figure 8:
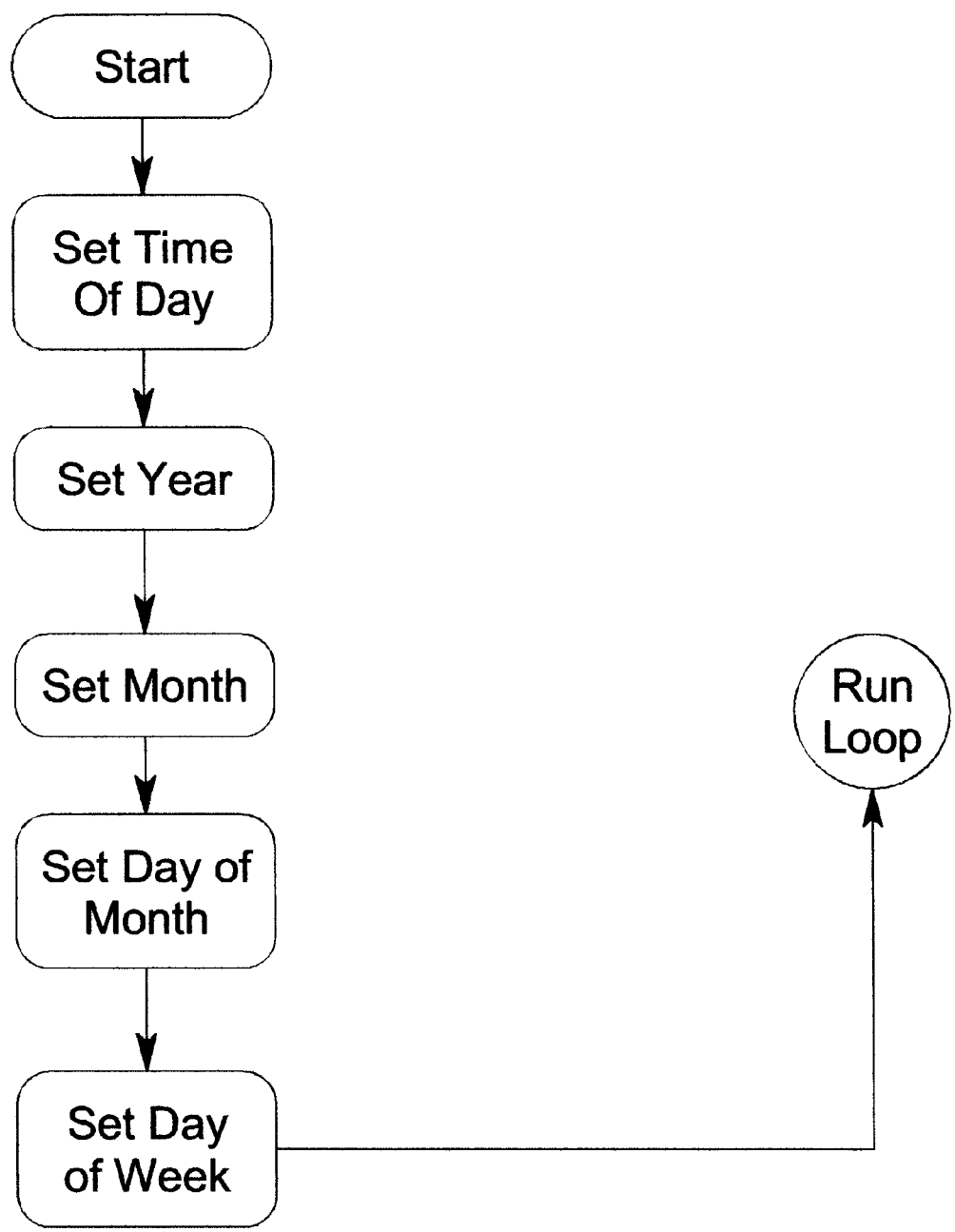
FIG. 8 is a flow chart of the Set Time subroutine according to the present invention.

In operation of the irrigation controller 20, the display 32 will flash SET TIME to let the user know the time needs to be set. The subroutine for this Set Time function is depicted in FIG. 8. In this mode, all functional keys 42 are acknowledged. However, the SET TIME display returns after each function is completed until the time is set. When Set Time 46 is pressed, the current time of day will flash in the display 32. The Up and Down keys 48 and 50 will adjust the time until Enter 52 is pressed. After Enter 52 is pressed, the current year will flash and can be set the same way. Then the current month will flash and can be set the same way. The day of the month will flash and can be adjusted. Lastly, the day of the week is set. After Enter 52 is pressed, the time of day is displayed, with only the colon flashing. This is the Normal Run Mode for the irrigation controller 20.

When Set Program 44 is pressed, the irrigation controller 20 enters the Set Program subroutine, which is shown in FIG. 7. In this mode, the display 32 flashes SET ZONE until Enter 52 is pressed. During this time, any zone the user wishes to program can be toggled on or off by pressing the appropriate zone key 42. Again, when a zone is selected, the LED 40 next to the zone key 42 lights. If pressed again, that zone LED 40 shuts off and that zone is deselected. Pressing Enter 52 with no zones selected brings the user back to Normal Run Mode. If multiple zones are selected, then they all are assigned the same start time and watering day cycle, but have independent watering lengths. After Enter 52 is pressed, the Display 32 flashes SET DAYS until Enter 52 is pressed again. Before Enter 52 is pressed, any day cycle can be selected by pressing the appropriate Day key 54. All selected zone LED's 40 will still be lit for the user's information. After Enter 52 is pressed, the Length LED 56 and the first selected zone LED 40 will light. The display 32 will show that zone's current programmed length, which can be adjusted with the Up and Down keys 48 and 50, from 0:00 to 4:00 (0–4 hours in 1 min. increments) until Enter 52 is pressed. The next selected zone LED 40 and length are then displayed. This continues through all selected zones. After the last zone is set, the Start Time LED 58 and all selected zone LED's 40 light to instruct the user that the watering program start time should be set. The display 32 shows the current first start time, which can be adjusted like the time of day, in 15-minute increments. When Enter 52 is pressed, a second start time flashes. Up to four start times can be set. The user selects DONE to set fewer. DONE can be found between 12:00 AM and 11:45 PM times. When DONE is entered for the time, the irrigation control system 20 is finished programming and stores the program to the EEPROM 30 and returns to Normal Run Mode. If DONE is not selected, programming finishes after the fourth start time is entered. In the procedure above, each zone may be programmed individually, or any combination of zones may be programmed together, giving high flexibility and ease of use.

Figure 10:
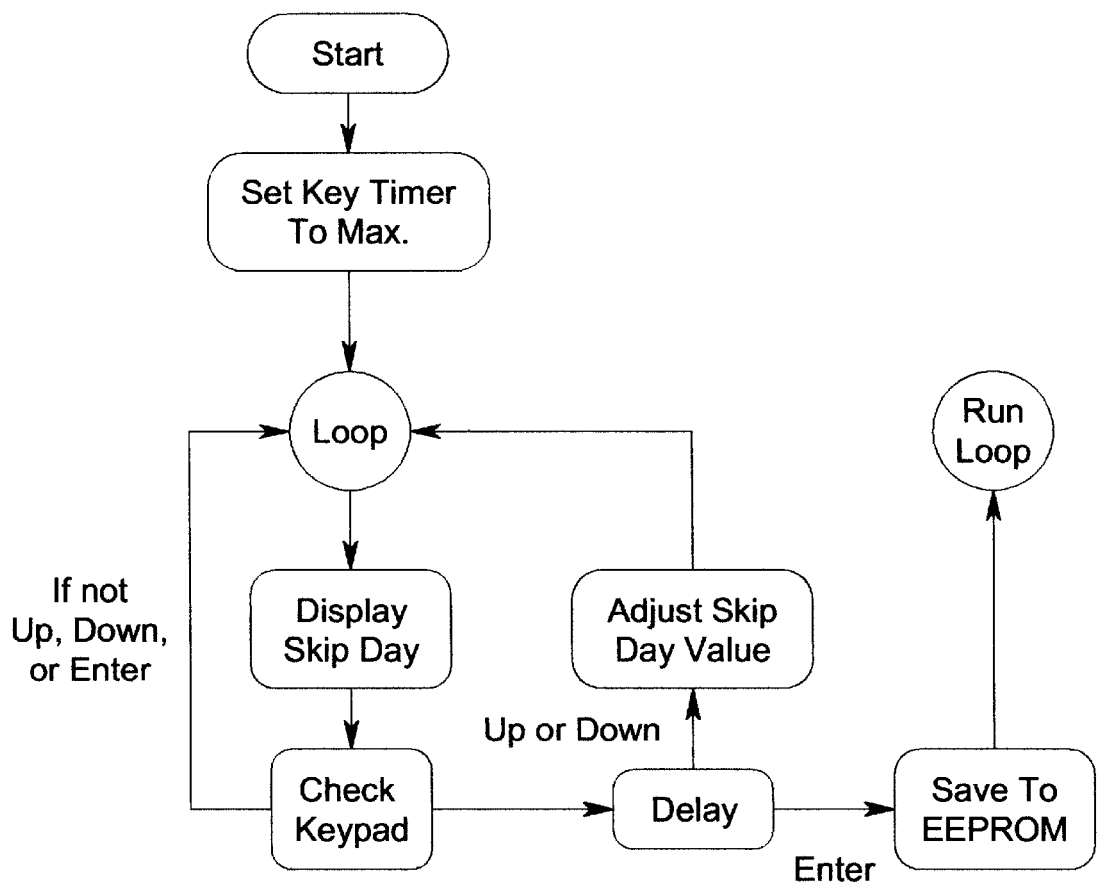
FIG. 10 is a flow chart of the Skip Day subroutine according to the present invention.

Pressing Skip Day 60 initiates the Skip Day subroutine shown in FIG. 10, which makes the display 32 flash the current day to be skipped. It can be adjusted with the Up and Down keys 48 and 50 until Enter 52 is pressed, which puts the irrigation controller 20 back into Normal Run Mode. The values of skip days are MON, TUE, WED, THU, FRI, SAT, SUN, and NONE. Selecting NONE disables the skip day feature. After Enter 52 is pressed, the value of skip day is saved to the EEPROM 30.

Figure 9:
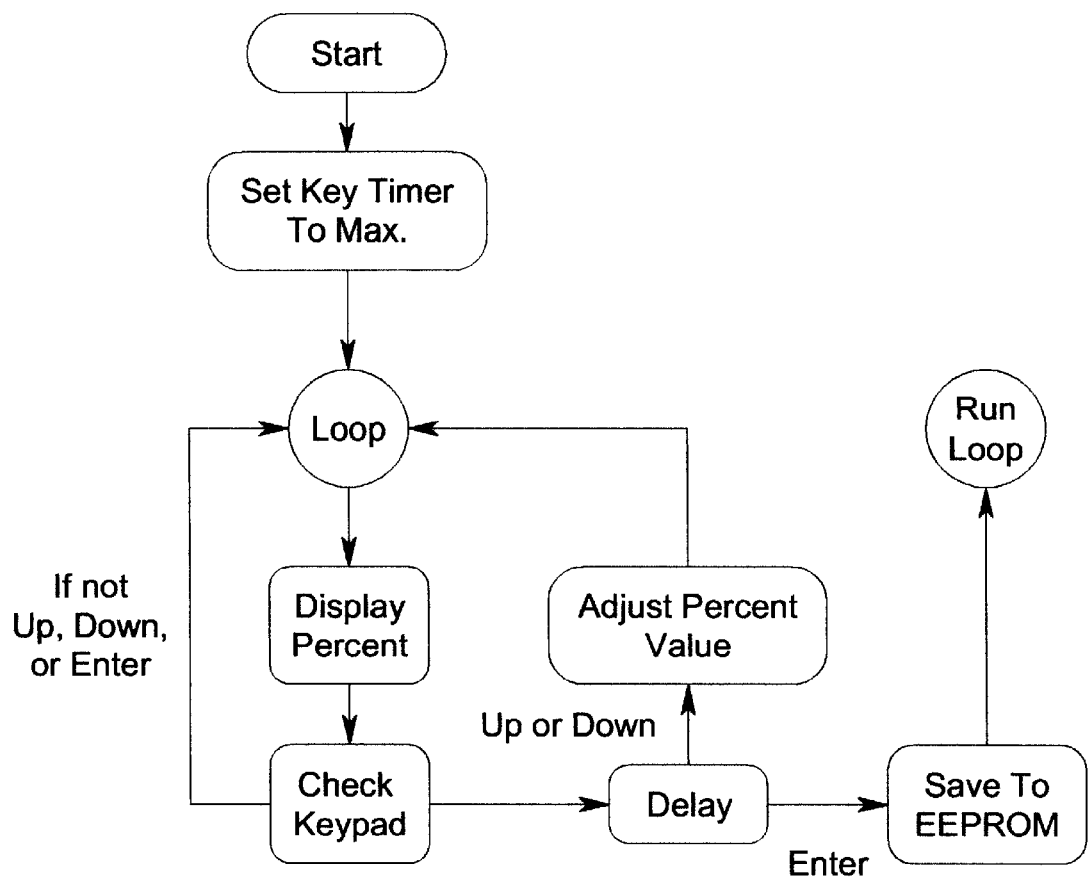
FIG. 9 is a flow chart of the Percent subroutine according to the present invention.

Pressing Water % 62 will initiate the Percent subroutine of FIG. 9, which brings the current value to the display 32. This value flashes until Enter 52 is pressed. It can be adjusted from 10% to 200%, in 10% increments, with the Up and Down keys 48 and 50 until Enter 52 is pressed, which puts the irrigation controller 20 in Normal Run Mode. The percentage adjusts the watering length time to all zones (e.g., 50% instructs the irrigation controller to water for half the programmed time). After Enter 52 is pressed, the value of water % is saved to the EEPROM 30. The algorithm does not allow water budgeting to set a time less then one minute. Accordingly, if a zone has a one-minute length programmed and the water % is set to 10%, then the watering length nonetheless will still be set to one minute. Whole minutes are used in the algorithm's calculations.

Figure 14:
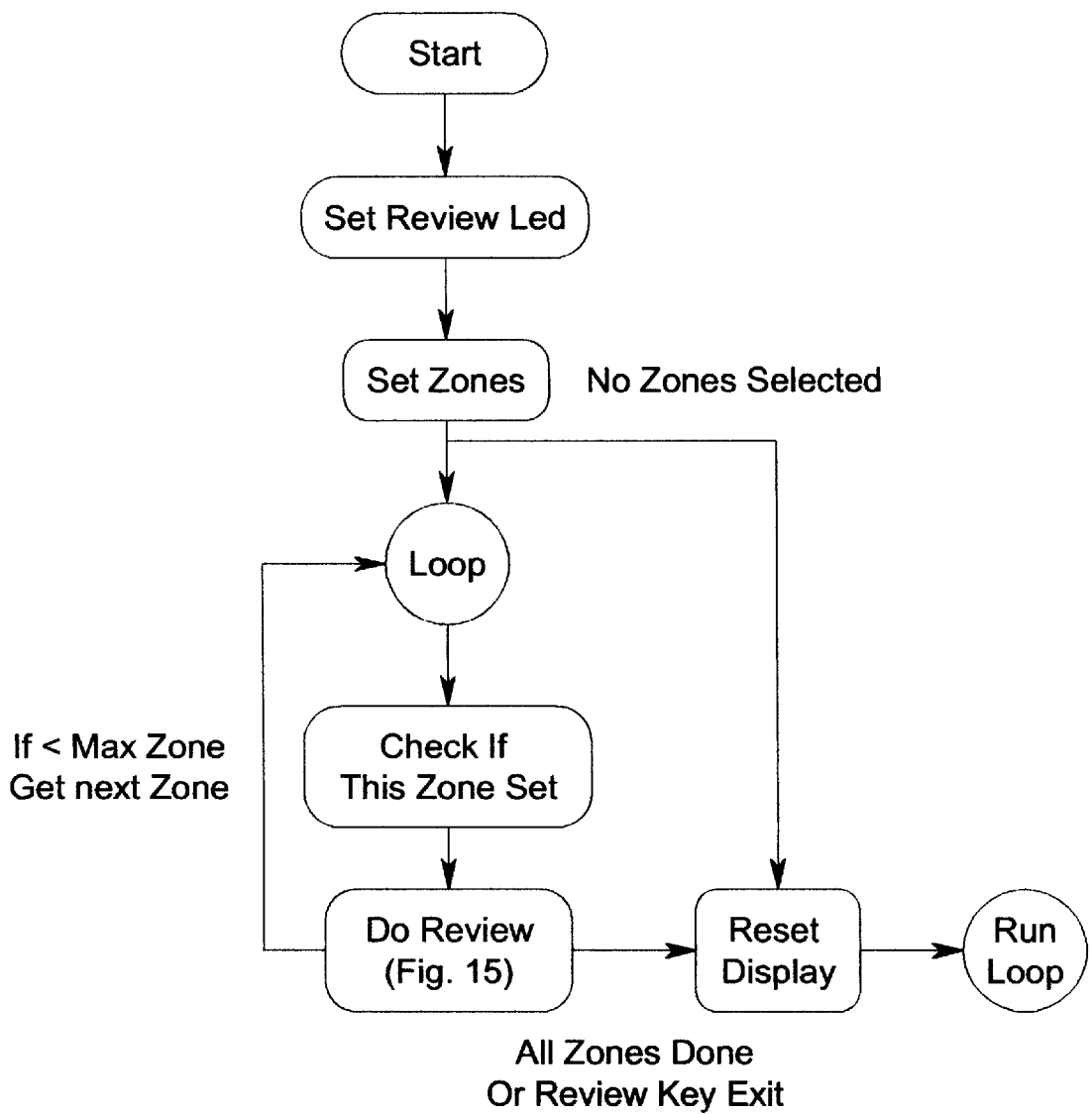
FIG. 14 is a flow chart of the Review subroutine according to the present invention.

The Review key 64 acts much like the Set Program key 44 except that no values can be adjusted. This allows the user to see what has been programmed without being able to change the program accidentally. After pressing Review 64, the Review subroutine of FIG. 14 is initiated, and SET ZONE flashes. The user selects all zones to be reviewed and presses Enter 52. The LED 40 for the first selected zone will light up and the LED 66 for the days will be lit. The user hits Enter 52 to get the length and Enter 52 again to get the start times for that zone. FIG. 15 shows the embedded Review subroutine for each zone. When the zone has been reviewed, hitting Enter 52 again will bring the user to the next zone selected. Pressing Review 64 a second time stops the review process and returns the irrigation controller 20 to Normal Run Mode. This is not the case with Set Program subroutine, which requires the user to complete all steps in predetermined order.

Figure 13:
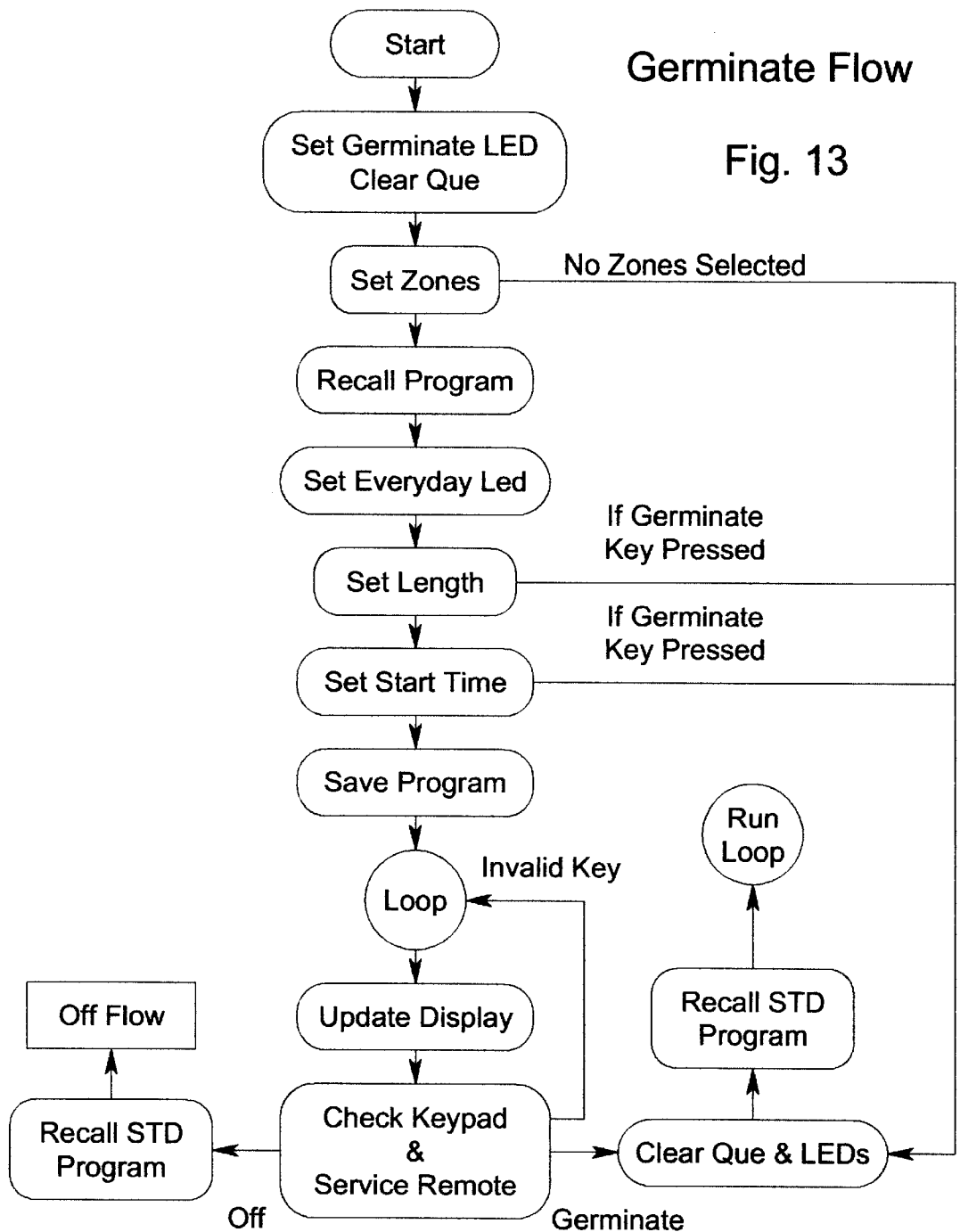
FIG. 13 is a flow chart of the Germinate subroutine according to the present invention.

A special germinate program provides a way to run an independent set of programs without affecting the normal program of the irrigation controller 20 (the normal program becomes temporarily inactive). When a Germinate key 68 is pressed, the Germinate subroutine of FIG. 13 is started, and a new program is recalled from the EEPROM 30. The LED 70 is lit to show the user it is using the germinate program, and SET ZONES flashes on the display 32. However, now only these zones will be watering and they will all have the same start time and will water every day. This allows more start times for germinating new lawn seed, which needs to be watered every day. The program will still ask for zone lengths for each zone and for the start times. The germinate program allows up to 9 start times instead of 4. This new program will be active until the germinate program is shut off with the Germinate key 68 or it is reprogrammed with the Set Program key 44. If Set Program 44 is pressed again and different zones are selected, only these new zones will water because there is only one program in germinate mode as opposed to one program for each zone in normal mode. After the last start time is set, the Germinate program is stored in the EEPROM 30. When the Germinate program is deactivated by pressing the Germinate key 68, the normal program is retrieved from the EEPROM 30 and the Germinate LED 70 is turned off.

Figure 12:
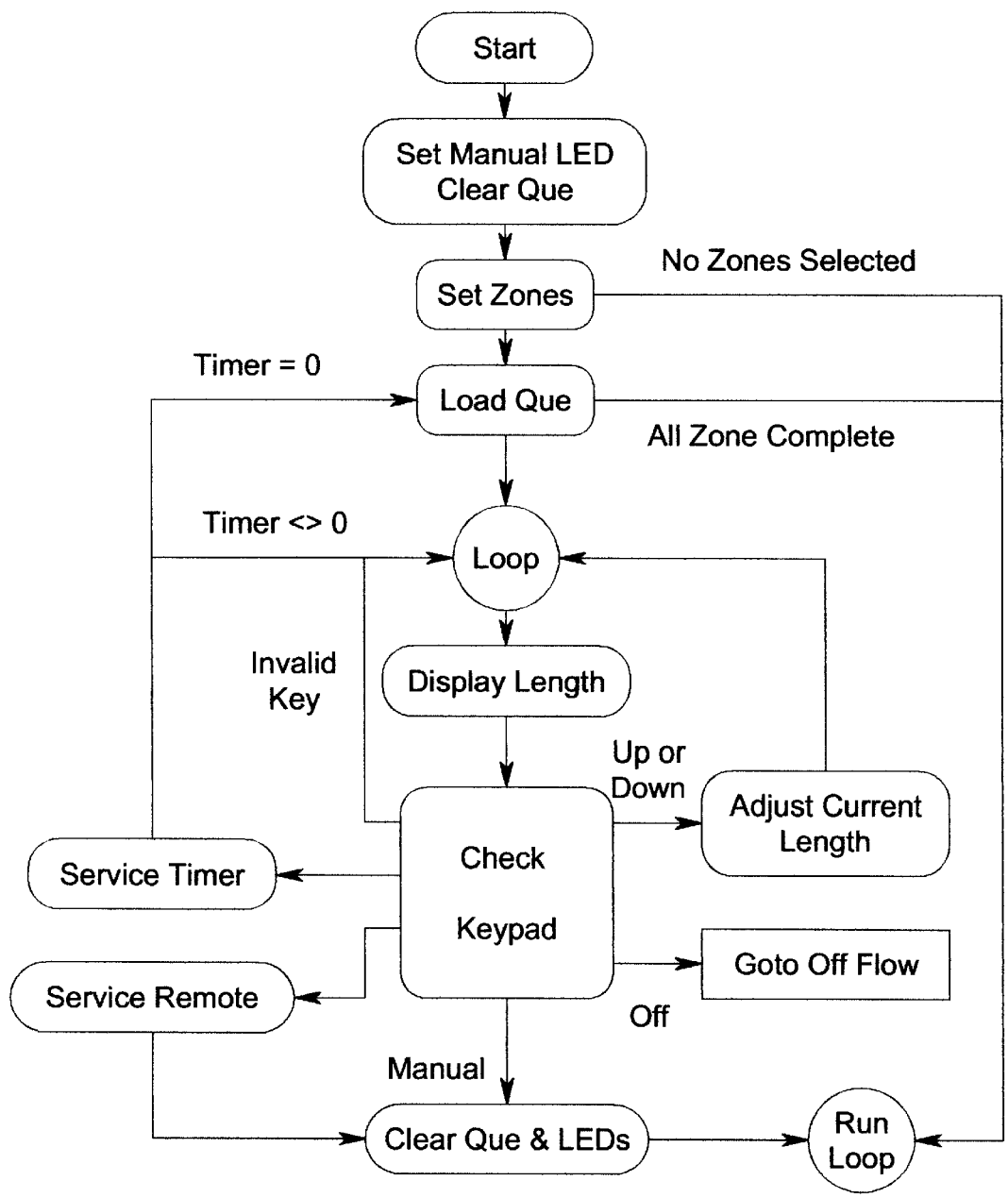
FIG. 12 is a flow chart of the Manual subroutine according to the present invention.

Pressing the Manual key 38 initiates the Manual subroutine shown in FIG. 12, which makes the display 32 flash SET ZONE until Enter 52 is pressed. During this time any or all zones can be selected or deselected. After Enter 52 is pressed, the first selected zone and the main valve (MV) (if connected) is activated and will run for its normal programmed length. During this time that length can be temporarily changed with the Up and Down arrows 48 and 50 over a range of one minute to eight hours. Then each selected zone will sequentially water until all selected zones have run. If any zones have a short fault, they will be tried now if selected. If the short has been repaired, the LED 40, which would have displayed red, will go out and the status will be cleared for the zone. This allows for an automatic resetting for short faults. In Normal Run Mode, shorting zones are not run thereby minimizing circuit stress.

Keeping in mind that each LED 40 proximate to each zone key 42 comprises a means for indicating whether that respective zone is selected, the astute observer may appreciate that the Length LED 56, the Start Time LED 58, each LED 66, and each LED 70 each essentially comprise a means for indicating an active programming function, which may be considered an additional element of the means for displaying information relating to watering programs. With these means for indicating an active programming function, the user's programming of the irrigation controller 20 is further simplified and elucidated. Blind programming is effectively eliminated as the user is guided through the programming process by the combined benefits derived from the means for indicating selected watering zones and the means for indicating an active programming function.

The remote control unit or diagnostic receiver (not shown) consists of a hand held transmitter and receiver, which plugs into a remote jack 74 on the main controller 80. This jack 74 can be extended to the outside to give the installer access to most of the irrigation controller's 20 features without having physical access to the main controller 80. The remote control transmitter has a numeric 0–9 keypad with Enter and Off keys that activate the irrigation controller 20 manually. If a zone is pressed, that zone is turned on and any others are turned off. An Off key is provided for turning off all zones.

The receiver of the remote control unit has a Winter key and a Status key. The Status key tells the main controller 80 to send the receiver short and open value status indications so the installer can troubleshoot without having access to the main controller 80. After being pressed, a numeric display on the diagnostic receiver will sequentially show zone numbers and the respective open or short status with a dual colored LED. A red LED means the zone matching the number in the display has a short. A yellow LED means the zone matching the number in the display has an open. Instead of the preferred LED numeric display in combination with the bi-colored status LED, the means for displaying the status of the valves in the irrigation system on the remote control device could comprise an LCD display, a CRT, a mechanical dial or dials, or any other appropriate means, none of which are shown.

The Winter key allows a multiplicity of zones (i.e., up to 6) to be turned on at the same time thereby allowing reduced time to blow out the system. When pressed, the irrigation controller 20 will allow a maximum permissible number of zones to be run simultaneously, which will depend on the current being drawn by the zones from the remote or from the Manual key 38.

Normal Run mode includes checking program times to see if any zones need to be started. Only one zone can run at a time in this mode, so if another zone is scheduled to start before one is finished, then that zone will wait until time is available to run (industry standard: program stacking). If no zone is watering, then the current time is displayed. If a zone is running, then that zone's remaining length is displayed as well as its zone LED 40 being lit. If a short or open is found, the status LED 40 is updated and the irrigation controller 20 goes on to the next zone or back to Normal Run Mode. An open is tried whenever the zone is scheduled to run, but a short is tried only in Manual mode or during operation of the remote.

In this preferred embodiment, the means for inducing remote operation of the valves of the irrigation system by the remote control device essentially comprises the wired data link communication port 28 in combination with the microprocessor 22. However, one will appreciate that the means could comprise any one of the wired data link, a radio data link, an infra-light link, or any other appropriate communication port 28 in combination with any one of the microprocessor 22, an analog compare circuit, a discrete logic circuit, or any other appropriate such means.

Not running an open zone allows the irrigation controller 20 to protect a pump run from the MV zone. If the pump is started with the MV zone and the zone is not working or not present, the pump would overheat due to backpressure. This irrigation controller 20 senses a non-present valve and prevents the MV zone from being active when no zones are being run. The irrigation controller 20 continuously monitors the current being drawn by the valves, keys 42 on the keyboard 34, and whether power is being supplied. If the rain sensor is active, then the display 32 reads RAIN to let the user know why the system is not watering. It also displays OFF when the irrigation controller 20 is turned off. If the power is off to the irrigation controller 20, then all values are shut off, the display 32 goes blank, no keys 42 are read, and the irrigation controller 20 goes to a low power state and only keeps track of the current time as long as the power backup system is active.

In light of the foregoing, it will be apparent that the present invention provides a number of advantages over prior art irrigation controllers and thereby presents a further step in the evolution of irrigation in general. For example, the irrigation controller 20 is capable of sending diagnostic information and the like from the main controller 80 to a remote unit that can be retained by a user in the field to provide for efficient system diagnosis and repair. Furthermore, with the provision of the EEPROM 30, the irrigation controller 20 allows flexible shifting between a plurality of watering programs including a specialized program for germinating seeds and the like. A further advantage of employing the EEPROM 30 is that the irrigation controller 20 does not lose memory even during extended periods without power so that watering programs and a status variable indicating whether the irrigation controller 20 was last on or off can be retained. Still further, the irrigation controller 20 provides a specialized winterize mode that permits activation of a multiplicity of watering zones simultaneously so that winterizing procedures can be carried out more efficiently and conveniently. Another advantage of the irrigation controller 20 is that it provides current sensing circuitry 24 that can detect how many valves are operational in each watering zone to allow the irrigation controller 20 to adjust the maximum allowable current and can prevent damage to the irrigation controller 20 by detecting when no valve is operational. Further still, the irrigation controller 20 clearly indicates selected zones and active programming functions thereby guiding a user during programming. Further advantages of the present invention will be readily obvious both to one who has reviewed the present disclosure and to one who has an opportunity to make use of an embodiment of the present invention.

It will be clear that the present invention has been shown and described with reference to certain preferred embodiments that merely exemplify the broader invention revealed herein. Certainly, those skilled in the art can conceive of alternative embodiments. For instance, those with the major features of the invention in mind could craft embodiments that incorporate those major features while not incorporating all of the features included in the preferred embodiments.

With the foregoing in mind, the following claims are intended to define the scope of protection to be afforded the inventor, and the claims shall be deemed to include equivalent constructions insofar as they do not depart from the spirit and scope of the present invention. A plurality of the following claims express certain elements as a means for performing a specific function, at times without the recital of structure or material. As the law demands, these claims shall be construed to cover not only the corresponding structure and material expressly described in the specification but also equivalents thereof.

I claim as deserving the protection of United States Letters Patent:

1. An irrigation controller for controlling watering programs in an irrigation system that comprises a plurality of watering zones with a plurality of valves, the irrigation controller comprising:

a means for enabling an inputting of commands relating to watering programs;

a means for receiving commands relating to watering programs;

a means for processing commands relating to watering programs;

a means for controlling the plurality of watering zones according to the commands;

a means for retaining information relating to watering programs; and a means for displaying information relating to watering programs;

wherein the means for enabling an inputting of commands, the means for receiving commands, the means for processing commands, the means for controlling the plurality of watering zones, and to means for retaining information in combination comprise a means for allowing a user to establish watering programs wherein each watering program comprises at least one selecting start time and at least one selected watering length; and wherein the means for allowing a user to establish watering programs further enables a user to input a Review command to cause the irrigation controller to enter a review mode wherein the means for enabling an inputting of commands relating to watering programs is disabled whereby a user can review a given watering program without risk of accidentally altering the watering program.

2. The irrigation controller of claim 1 wherein the means for allowing a user to establish watering programs enables a user to establish a selected start time and a selected watering length individually for each of a plurality of watering zones and wherein the means for allowing a user to establish watering programs further enables a user to select simultaneously a single selected start time and a single selected watering length for a plurality of watering zones.

3. The irrigation controller of claim 2 wherein the means for allowing a user to establish watering programs further enables a user to input a Skip Day command wherein a user can induce the watering program to skip one or more days.

4. An irrigation controller for controlling watering programs in an irrigation system that comprises a plurality of watering zones with a plurality of valves, the irrigation controller comprising:

a means for enabling an inputting of commands relating to watering programs;

a means for receiving commands relating to watering programs;

a means for processing commands relating to watering programs;

a means for controlling the plurality of watering zones according to the commands;

a means for retaining information relating to watering programs; and a means for displaying information relating to watering programs;

wherein the means for enabling an inputting of commands, the means for receiving commands, the means for processing commands, the means for controlling the plurality of watering zones, and the means for retaining information in combination comprise a means for allowing a user to establish watering programs wherein each watering program comprises at least one selected start time and at least one selected watering length; and wherein the means for allowing a user to establish watering programs further enables a user to input a Germinate command wherein a user can establish a germinate watering program that temporarily replaces a basic watering program that continues to be retained by the means for retaining information relating to watering programs, wherein the means for allowing a user to establish watering programs enables a user to input up to a given number of start times relative to the basic watering program while enabling a user to input a greater number of start times than the given number of start times relative to the germinate watering program, and wherein the germinate watering program automatically induces every day watering in the irrigation system whereby a user can temporarily replace a basic watering program with the germinate watering program that enables more frequent start times every day for enabling a germination of newly planted seed and whereby the user can supplant the germinate watering program with the basic watering program without a need for re-inputting the basic watering program.

5. An irrigation controller for controlling watering programs in an irrigation system that comprises a plurality of watering zones with a plurality of valves, the irrigation controller comprising:

a means for enabling an inputting of commands relating to watering programs;

a means for receiving commands relating to watering programs;

a means for processing commands relating to watering programs;

a means for controlling the plurality of watering zones according to the commands;

a means for retaining information relating to watering programs; and a means for displaying information relating to watering programs;

wherein the means for enabling an inputting of commands, the means for receiving commands, the means for processing commands, the means for controlling the plurality of watering zone, and the means for retaining information in combination comprise a means for allowing a user to establish watering programs wherein each watering program comprises at least one selected start time and at least one selected watering length; and wherein the irrigation controller further comprises a means for preventing simultaneous operation of a number of valves excessive of the maximum number of valves that allows for proper operation of the irrigation system during a normal operation of the irrigation controller and wherein the means for allowing a user to establish watering programs further enables a user to input a Winterize command to cause the irrigation controller to enter a winterize mode wherein a multiplicity of the plurality of valves can be simultaneously operated at any one time whereby a user can winterize an irrigation system more quickly than the user could if only one valve of the plurality of valves could be operated at any one time.

6. The irrigation controller of claim 5 wherein the means for preventing simultaneous operation of a number of valves excessive of the maximum number of valves that allows for proper operation of the irrigation system during a normal operation of the irrigation controller comprises a power supply with a maximum current capability, a means for measuring current draw from the power supply, and a means for comparing the current draw from the power supply with the maximum current capability of the power supply.

7. The irrigation controller of claim 6 wherein the means for measuring current draw from the power supply comprises an analog-to-digital converter operably associated with the means for processing commands relating to watering programs and the means for controlling the plurality of watering zones according to the commands for providing a digital reading of current draw.

8. An irrigation controller for controlling watering programs in an irrigation system that comprises a plurality of watering zones with a plurality of valves, the irrigation controller comprising:

a means for enabling an inputting of commands relating to watering programs;

a means for processing commands relating to watering programs;

a means for controlling the plurality of watering zones according to the commands;

a means for displaying information relating to watering programs; and a means for retaining information relating to watering programs in the absence of power whereby the irrigation controller can retain watering programs even during extended periods without power wherein the means for retaining watering programs in the absence of power comprises an electrically erasable programmable readonly memory device operably associated with the means for processing commands relating to watering programs and the means for controlling the plurality of watering zones according to the commands.

9. The irrigation controller of claim 8 wherein the electrically erasable programmable read-only memory device comprises sufficient read-only memory for simultaneously retaining a plurality of watering programs whereby the means for processing commands relating to watering programs and the means for controlling the plurality of watering zones according to the commands can selectively access one or more of the plurality of watering programs at a given time.

10. The irrigation controller of claim 8 wherein the means for retaining watering programs in the absence of power further comprises a means for retaining whether the irrigation controller is on or off in the absence of power whereby the irrigation controller can remember whether it was on or off even after extended periods without power.

11. An irrigation controller for controlling watering programs in an irrigation system that comprises a plurality of watering zones with a plurality of valves, the irrigation controller comprising:

a means for enabling an inputting of commands relating to watering programs;

a means for processing commands relating to watering programs;

a means for controlling the plurality of watering zones according to the commands;

a means for displaying information relating to watering programs;

a means for retaining information relating to watering programs; and a means for detecting how many valves are operational in a given watering zone and a means for automatically adjusting a maximum allowable current in response to how many valves are operational in a given watering zone wherein the means for detecting how many valves are operational in a given watering zone comprises an analog precision rectifier.

12. An irrigation controller for controlling watering programs in an irrigation system that comprises a plurality of watering zones with a plurality of valves, the irrigation controller comprising:

a means for enabling an inputting of commands relating to watering programs;

a means for processing commands relating to watering programs;

a means for controlling the plurality of watering zones according to the commands;

a means for displaying information relating to watering programs;

a means for retaining information relating to watering programs;

a remote control unit; and a means for transmitting diagnostic information to the remote control unit regarding a status of the valves of the irrigation system.

13. The irrigation controller of claim 12 further comprising a means operably associated with at least the remote control unit for inducing remote operation of the valves of the irrigation system.

14. The irrigation controller of claim 12 wherein the means for transmitting diagnostic information to the remote control unit regarding a status of the valves of the irrigation system comprises a means for sending a signal from the remote control unit to the means for processing commands relating to watering programs and the means for controlling the plurality of watering zones according to the commands to induce the means for processing commands relating to watering programs and the means for controlling the plurality of watering zones according to the commands to send a test signal to each valve in the irrigation system, a means for measuring a current across each valve, a means for determining based on the current across the valve whether each valve is open or shorted, a means for transmitting whether each valve is open or shorted to the remote control unit, and a means for displaying the status of the valves in the irrigation system on the remote control unit.

15. The irrigation controller of claim 14 wherein the means for displaying the status of the valves in the irrigation system on the remote control unit comprises at least one LED numeric display in combination with a bi-color status LED wherein the LED numeric display displays any faulty zones and the bi-color status LED indicates with a first color whether the faulty zone is open and with a second color whether the faulty zone is shorted.

16. The irrigation controller of claim 12 wherein the means for transmitting diagnostic information to the remote control unit regarding a status of the valves of the irrigation system comprises a communication port comprising a four wire interface wherein two wires send power and ground and two wires provide a differential signal path.

17. An irrigation controller for controlling watering programs in an irrigation system that comprises a plurality of watering zones with a plurality of valves, the irrigation controller comprising:

a means for selecting one or more of the plurality of watering zones to create a selected watering zone or zones wherein the means for selecting one or more of the plurality of watering zones comprising a key for each watering zone;

a means for displaying information relating to watering programs comprising a means for indicating the selected watering zone or zones wherein the means for indicating the selected watering zone or zones comprises an indicator light disposed proximate each key for indicating whether the watering zone that is selectable by that key is a selected watering zone;

a means for enabling an inputting of commands relating to watering programs for the plurality of watering zones;

a means for processing commands relating to watering programs;

a means for controlling the plurality of watering zones according to the commands; and a means for retaining information relating to watering programs;

wherein the means for enabling an inputting of commands, the means for processing commands relating to watering programs, the means for controlling the plurality of watering zones according to the commands, and the means for retaining information in combination comprise a means for allowing a user to establish watering programs wherein each watering program comprises at least one selected start time and at least one selected watering length.

18. The irrigation controller of claim 17 wherein the indicator light proximate each key comprises an LED.

19. The irrigation controller of claim 17 wherein each key comprises a membrane keypad key.

20. The irrigation controller of claim 17 wherein the means for displaying information relating to watering programs further comprises a means for indicating an active programming function.

21. An irrigation controller for controlling watering programs in an irrigation system that comprises a plurality of watering zones with a plurality of valves, the irrigation controller comprising:

a means for selecting one or more of the plurality of watering zones to create a selected watering zone or zones;

a means for displaying information relating to watering programs comprising a means for indicating the selected watering zone or zones;

a means for enabling an inputting of commands relating to watering programs;

a means for processing commands relating to watering programs;

a means for controlling the plurality of watering zones according to the commands; and a means for retaining information relating to watering programs;

wherein the means for enabling an inputting of commands, the means for processing commands relating to watering programs, the means for controlling the plurality of watering zones according to the commands, and the means for retaining information in combination comprise a means for allowing a user to establish watering programs wherein each watering program comprises at least one selected start time and at least one selected watering length;

wherein the means for allowing a user to establish watering programs enables a user to establish a selected start time and a selected watering length individually for each of a plurality of watering zones;

wherein the means for allowing a user to establish watering programs further enables a user to select simultaneously for a plurality of watering zones a single selected start time and a single selected watering length;

wherein the means for allowing a user to establish watering programs further enables a user to input a Skip Day command wherein a user can induce the watering program to skip one or more days;

wherein the means for allowing a user to establish watering programs further enables a user to input a Water Percent command wherein a user can induce the watering program to water one or more watering zones for a selected percentage of a length of the selected watering length for the one or more watering zones whereby a user can alter an actual watering time of the one or more watering zones without changing the selected watering length for the one or more watering zones;

wherein the means for allowing a user to establish watering programs further enables a user to input a Germinate command wherein a user can establish a germinate watering program that temporarily replaces a basic watering program that continues to be retained by the means for retaining information relating to watering programs, wherein the means for allowing a user to establish watering programs enables a user to input up to a given number of start times relative to the basic watering program while enabling a user to input a greater number of start times than the given number of start times relative to the germinate watering program, and wherein the germinate watering program automatically induces every day watering in the irrigation system whereby a user can temporarily replace a basic watering program with the germinate watering program that enables more frequent start times every day for enabling a germination of newly planted seed and whereby the user can replace the germinate watering program with the basic watering program without a need for re-inputting the basic watering program;

a means for preventing simultaneous operation of a number of valves excessive of the maximum number of valves that allows for proper operation of the irrigation system during a normal operation of the irrigation controller;

wherein the means for allowing a user to establish watering programs further enables a user to input a Winterize command to cause the irrigation controller to enter a winterize mode wherein a multiplicity of the plurality of valves can be simultaneously operated at any one time whereby a user can winterize an irrigation system more quickly than the user could if only one valve of the plurality of valves could be operated at any one time; and wherein the means for allowing a user to establish watering programs further enables a user to input a Review command to cause the irrigation controller to enter a review mode wherein the means for enabling an inputting of commands relating to watering programs is disabled whereby a user can review a given watering program without risk of accidentally altering the watering program.

* * * * *